United States Patent
Maslin

(10) Patent No.: US 10,678,998 B1
(45) Date of Patent: Jun. 9, 2020

(54) INTELLIGENT EXTRACTION AND ORGANIZATION OF DATA FROM UNSTRUCTURED DOCUMENTS

(71) Applicant: Paycor, Inc., Cincinnati, OH (US)

(72) Inventor: Matt Maslin, Ladera Ranch, CA (US)

(73) Assignee: Paycor, Inc., Cincinnati, OH (US)

( * ) Notice: Subject to any disclaimer, the term of this patent is extended or adjusted under 35 U.S.C. 154(b) by 0 days.

(21) Appl. No.: 16/371,626

(22) Filed: Apr. 1, 2019

Related U.S. Application Data

(63) Continuation of application No. 15/900,311, filed on Feb. 20, 2018, now Pat. No. 10,296,578.

(51) Int. Cl.
*G06F 16/35* (2019.01)
*G06F 40/18* (2020.01)

(52) U.S. Cl.
CPC ........... *G06F 40/18* (2020.01); *G06F 16/353* (2019.01)

(58) Field of Classification Search
None
See application file for complete search history.

(56) References Cited

U.S. PATENT DOCUMENTS

| | | |
|---|---|---|
| 7,574,742 B2 | 8/2009 | Yang et al. |
| 7,590,647 B2 | 9/2009 | Srinivasan et al. |
| 7,792,814 B2 | 9/2010 | Cohen |
| 7,849,030 B2 | 12/2010 | Ellingsworth |
| 7,849,048 B2 | 12/2010 | Langseth et al. |
| 7,849,049 B2 | 12/2010 | Langseth et al. |
| 8,266,148 B2 | 9/2012 | Guha et al. |
| 8,352,855 B2 | 1/2013 | Levy et al. |
| 8,504,553 B2 | 8/2013 | Vailaya et al. |
| 8,825,592 B2 | 9/2014 | Lobo et al. |
| 8,856,642 B1 | 10/2014 | Riediger et al. |
| 9,009,133 B2 | 4/2015 | Hardy |
| 9,183,285 B1 | 11/2015 | Brown et al. |
| 9,280,525 B2 | 3/2016 | Olszewski et al. |
| 9,658,991 B2 | 5/2017 | Bruno et al. |
| 9,760,571 B1 | 9/2017 | Ben-Natan et al. |
| 10,296,578 B1 | 5/2019 | Maslin |
| 2003/0206201 A1 | 11/2003 | Ly |
| 2004/0167883 A1 | 8/2004 | Wakefield et al. |
| 2007/0106686 A1 | 5/2007 | Shank et al. |
| 2009/0259954 A1 | 10/2009 | Chenthamarakshan et al. |
| 2010/0174732 A1 | 7/2010 | Levy et al. |

(Continued)

OTHER PUBLICATIONS

Balakrishna, K., et al., "Extracting Structure Data From UnStructured Data Through HiveQL," International Journal of Engineering and Computer Science, Apr. 2015, 4(4):11322-11331, downloaded from http://www.ijecs.in/issue/v4-i4/40%20ijecs.pdf, 9 pgs.

(Continued)

*Primary Examiner* — Sanchita Roy
(74) *Attorney, Agent, or Firm* — Frost Brown Todd LLC

(57) ABSTRACT

Data elements from an input document can be automatically organized into rows and columns in a structured output document using a grouping process that automatically applies matching criteria based on horizontal position, data content and horizontal extent and tests for horizontal overlaps between data elements and neighbors of data elements in existing groups, assigns columns to those groups based on horizontal positions of data elements from groups that have already been assigned to columns. Rows may be assigned to data elements based on those data elements' vertical positions.

18 Claims, 6 Drawing Sheets

(56) References Cited

U.S. PATENT DOCUMENTS

| 2012/0303645 | A1 | 11/2012 | Kulkarni-Puranik |
| 2015/0019537 | A1 | 1/2015 | Neels et al. |
| 2016/0117551 | A1 | 4/2016 | Hausmann et al. |
| 2016/0371238 | A1 | 12/2016 | Heavenrich et al. |
| 2017/0060992 | A1 | 3/2017 | Bhide et al. |
| 2017/0169103 | A1 | 6/2017 | Juneja et al. |
| 2017/0235735 | A1 | 8/2017 | Ignatyev et al. |

OTHER PUBLICATIONS

Feldman, R., et al., *The Text Mining Handbook*, Cambridge University Press, New York, 2007, https://wtlab.um.ac.it/images/e-library/text_mining/The%20Text%20Mining%20HandBook.pdf, 421 pgs. (4 parts, part 1, 130 pgs., part 2, 120, pgs., part 3, 117 pgs., part 4, 54 pgs.).

Gupta, R., et al., "Answering Table Augmentation Queries from Unstructured Lists on the Web," Journal Proceedings of the VLDB Endowment, Aug. 2009, 2(1):289-300, downloaded from http:/www.vldb.org/pvldb/2/vldb09-652.pdf, 12 pgs.

Marx, Z., et al., "Coupled Clustering: A Method for Detecting Structural Correspondence," Journal of Machine Learning Research 2002, 3:747-780, downloaded from http://www.jmlr.org/papers/volume3/marx02a/marx02a.pdf, 34 pgs.

Mor, Y., "Processing Unstructured Data 101," Xplenty Jun. 2014 downloaded from https://www.xplenty.com/blog/processing-unstructured-data-101/, 6 pgs.

Ronk, J., "Structured, Semi Structured and Unstructured Data," Worppress.com, Sep. 2014, https://jeremyronk.wordpress.com/2014/09/01/structured-semi-structured-and-unstructured-data/.

Sharma, Ph.D., S., "An Extended Classification and Comparison of NoSQL Big Data Models," Center for Survey Statistics and Methodology, Iowa State Univ., Ames, IA, USA, Sep. 2015, downloaded from https://arxiv.org/ftp/arxiv/papers/1509/5509.08035.pdf, 23 pgs.

FIG. 1

|  | $X_1$ | $X_2$ | $X_3$ | $X_4$ | $X_5$ | $X_6$ | $X_7$ | $X_8$ | $X_9$ |
|---|---|---|---|---|---|---|---|---|---|
| $Y_1$ | **** 100 | | | | | | | | |
| $Y_2$ | 04/15/15 | | | | | | | | |
| $Y_3$ | 04/15/15 | | | | | | | | |
| $Y_4$ | 05/08/15 | | | | | | | | |
| $Y_5$ | 05/08/15 | | | | | | | | |
| $Y_6$ | **** 102 FACILITY MGR | | | | | | | | |
| $Y_7$ | 04/15/15 | | | | | | | | |
| $Y_8$ | 04/15/15 | | | | | | 3.00 | | |
| $Y_9$ | 05/08/15 | | | | | | | | |
| $Y_{10}$ | 05/08/15 | | | 544.50 | | | | | |
| $Y_{11}$ | **** 200 CHILD CARE WORKERS | | | | | | | | |
| $Y_{12}$ | 04/15/15 | | | 544.50 | | | 6.00 | | |
| $Y_{13}$ | 04/15/15 | | | 546.00 | | | 3.00 | | |
| $Y_{14}$ | 05/08/15 | | | 544.50 | | | | | |
| $Y_{15}$ | 05/08/15 | | | 546.00 | | | | | |
| $Y_{16}$ | | | | | | | 3.00 | | |

INTELLIGENT EXTRACTION AND ORGANIZATION OF DATA FROM UNSTRUCTURED DOCUMENTS

CROSS REFERENCE TO RELATED APPLICATIONS

This is a continuation of, and claims the benefit of, U.S. non-provisional patent application Ser. No. 15/900,311, filed on Feb. 20, 2018, which application is hereby incorporated by reference in its entirety.

FIELD

The disclosed technology can be applied to the extraction of data from unstructured documents and the organization of that data in a structured form, such as columns and rows of a spreadsheet.

BACKGROUND

Modern businesses run on data. However, despite the importance of data, and in particular the suitability of data for various analytic and processing functions, information is often available only in forms which are neither optimized nor suitable for anything more than storage. For example, payroll, expense or other types of records may be provided to a company for ingestion in the form images which would require significant processing before the information they depict could be used in any further processes. While the ubiquity of this situation has led to various approaches to extracting and organizing information from images or other types of unstructured documents, approaches currently in use have significant drawbacks. For example, document processing software that attempts to extract and organize information based on whitespace between items can fail for documents that include internal headers. Accordingly, there is a need for technology that is able to extract information from unstructured documents and organize it in a structured manner and that does not fail for documents with internal headers or in other cases that have proven problematic for solutions currently in use.

SUMMARY

The technology disclosed herein can be applied in a variety of manners. For example, some aspects of the disclosed technology can be used to implement a system comprising a computer configured with instructions encoded on a non-transitory computer readable medium that are operable to, when executed, cause the computer to perform various acts. Such acts may comprise organizing a plurality of data elements from an input document into a set of groups by repeatedly performing a grouping process, assigning each group from the set of groups to a column based on horizontal positions of data elements from groups that have already been assigned to columns, for each data element, assigning that data element to a row based on that data element's vertical position, and, for each data element, adding that data element to a structure document in the row assigned to that data element and in the column assigned to the group which comprises that data element. In such a system, the grouping process may comprise performing a matching determination of if a subject data element satisfies a matching criteria for an existing group, performing an overlap determination of if the subject data element is associated with a horizontal extent that overlaps a neighbor of one of the existing group's data elements, and selectively adding the subject data element to the existing group based on the matching determination and the overlap determination.

As another example of how aspects of the disclosed technology may be applied, some aspects may be used to implement a method for automatically organizing data from one or more input documents into rows and columns in a structured output document. Such a method may comprise obtaining a set of matching criteria that define matches based on horizontal position, data content and horizontal extent associated with data elements; obtaining a plurality of data elements from an input document corresponding to desired information for rows and columns in the structured output document; generating a set of data element groups by repeatedly applying the set of matching criteria to the data elements and testing for horizontal overlaps between data elements and neighbors of data elements in existing groups; and applying the data elements and set of data element groups, respectively, to rows and columns of the output document to generate the structured output document with columns extending across internal headings in the one or more input documents.

As another example of how aspects of the disclosed technology may be applied, some aspects may be used to implement a system for automatically organizing data from one or more input documents into rows and columns in a structured output document. Based on this disclosure, such a system may comprise a means for grouping data elements from an input document into a set of groups based on satisfaction of matching criteria and testing for horizontal overlaps between data elements and neighbors of other data elements. Such a system may also comprise a means for assigning columns to groups from the set of groups based on horizontal positions of data elements from groups that have already been assigned to columns.

Other potential embodiments of aspects of the disclosed technology, including other machines, methods and articles of manufacture are also possible, and will be immediately apparent to and could be implemented without undue experimentation by one of ordinary skill in the art in light of this disclosure. Accordingly, the examples set forth above should be understood as being illustrative only, and should not be treated as implying limits on the scope of protection provided by this document or any related document.

BRIEF DESCRIPTION OF THE DRAWINGS

The drawings and detailed description that follow are intended to be merely illustrative and are not intended to limit the scope of the invention as contemplated by the inventor.

FIG. 1 provides illustrative examples of input and output documents.

FIG. 5 illustrates an exemplary input document which could be processed to create structured output.

FIG. 6 illustrates how groups of data elements could potentially be assigned to columns.

DETAILED DESCRIPTION

Figure 2:
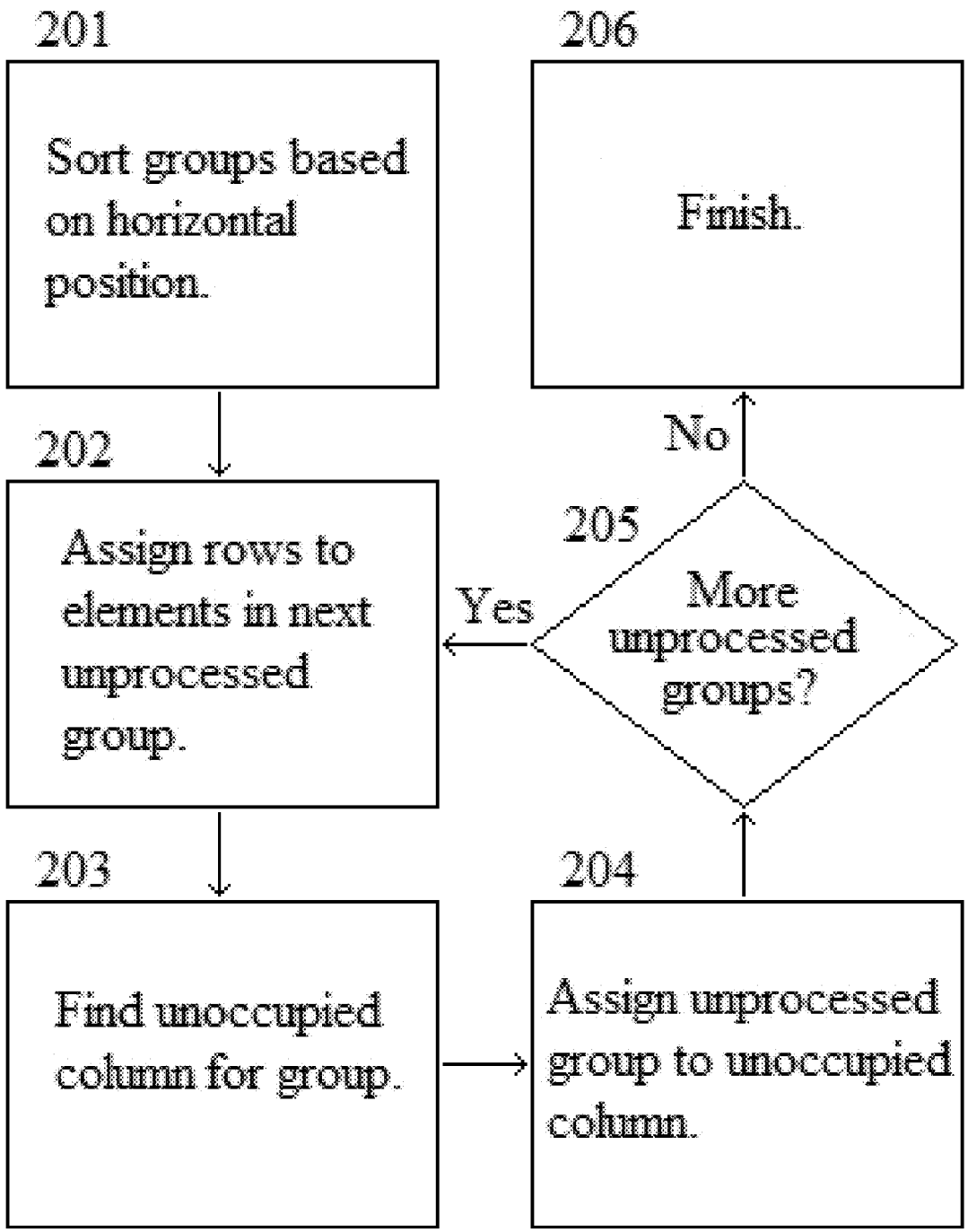
FIG. 2 illustrates a method which can be used to assign positions in a structured document to data elements from an unstructured document.

The inventor has conceived of novel technology that, for the purpose of illustration, is disclosed herein as applied in the context of extracting and organizing information from a PDF image of a spreadsheet or other similar document. While the disclosed applications of the inventor's technology satisfy a long-felt but unmet need in the art of information extraction and organization, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
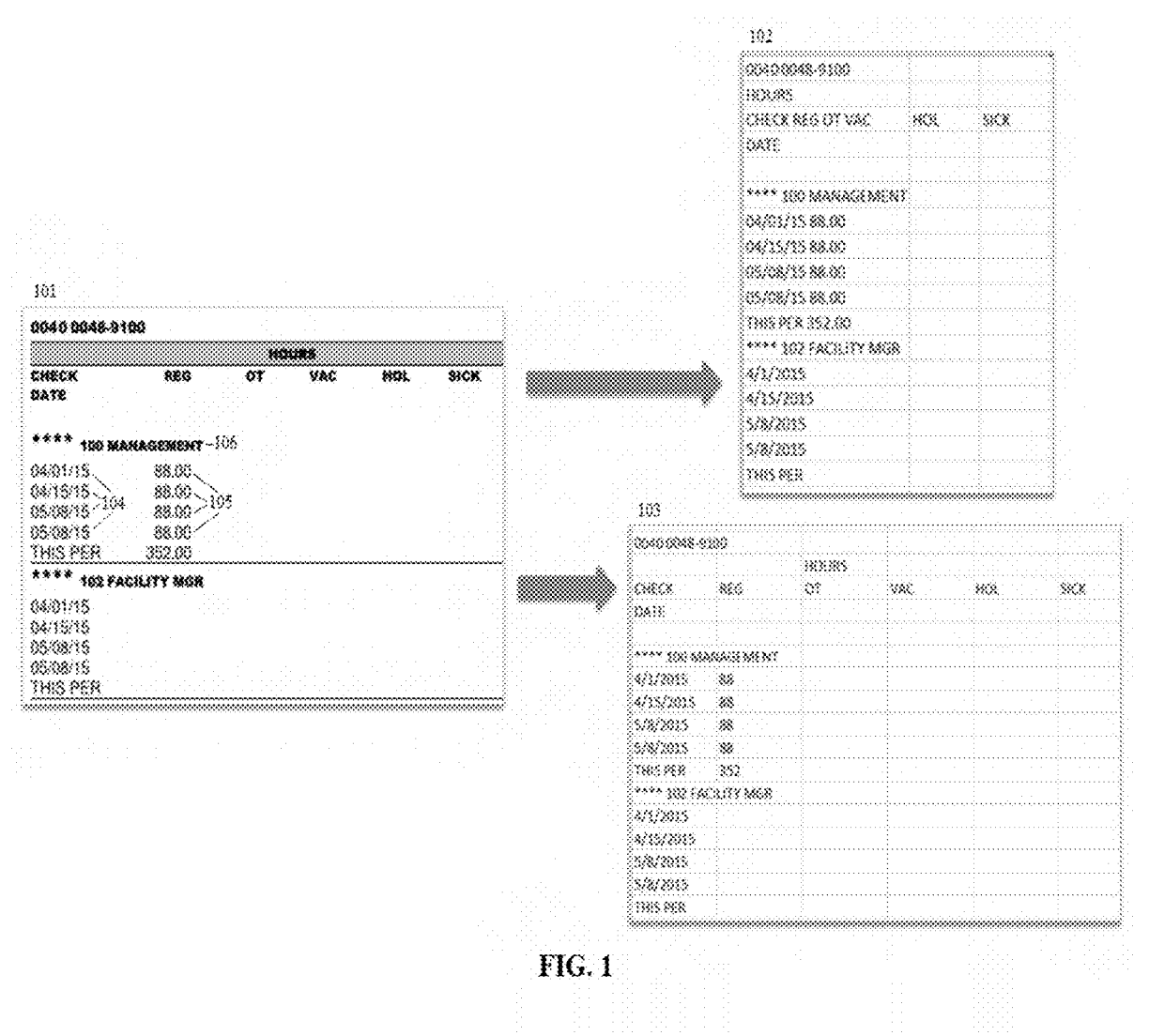

Turning first to FIG. 1, that figure provides an illustrative example of an input document 101, as well as two output documents 102 103 which could be generated by extracting the information from the input document 101 and organizing it in two different ways. As shown in FIG. 1, applying different ways of extracting and organizing information from a single input document 101 may result in different types of organization and levels of structure in a resulting output document. For example, if information in an input document 101 is organized into columns based on detection of whitespace (e.g., consistent vertical whitespace, which could be treated as indicating column breaks), then the result may be an output document such as the first output document 102 shown in FIG. 1, in which items such as dates 104 and amounts 105 falling under the **** 100 MANAGEMENT label 106 are grouped together in a single column. Alternatively, if a different process, such as one based on attributes (e.g., position, type, etc.) of data elements is used, the result may be an output document such as the second output document 103 shown in FIG. 1, in which dates 104 and amounts 105 are split into separate columns despite falling under a single label 106 that spans both of the columns below it. Other approaches to extracting and organizing information, such as manually defining extraction and organization rules for particular documents (or types of documents) and then applying those rules to the documents (or types of documents) to which they relate are also possible, and may result in other types of output documents than those shown in FIG. 1.

Turning next to FIG. 2, that figure depicts a method that can be used to assign positions in a structured document to data elements that are individually associated with vertical positions in an input document and that are associated with groups based on their horizontal positions in the input document. Initially, in the method of FIG. 2, the various groups are sorted 201 based on their horizontal positions. For example, algorithms such as merge sort, bubble sort, or quicksort could be used to order the groups such that the first group would be the group whose farthest rightmost extent (i.e., the maximum x coordinate in the original input document of any of the data elements in that group) was farthest to the left (i.e., had the lowest value x coordinate in the original input document), the second group would be the group whose farthest rightmost extent was second farthest to the left, and so on. Other alternatives, such as sorting based on the farthest leftmost extent rather than farthest rightmost extent, and/or sorting in descending rather than ascending order of horizontal position are also possible, and may be utilized in some embodiments as well (or as alternatives).

However the sorting 201 is performed, after it is complete, the method of FIG. 2 continues by assigning 202 rows to each data element in the first group. As with the sorting of groups based on horizontal positions, this assigning 202 of rows may be performed in different way in different embodiments. For example, in some embodiments, rows may be assigned 202 by, for each data element, taking that data element's vertical position (e.g., y coordinate of the lower left corner of that element in the input document), dividing that position by 50 (or some other value representative of the height of characters making up data elements in an input document), and discarding the remainder. Alternatively, in other embodiments rows may be assigned 202 by vertical positions relative to each other, such as by assigning the data element with the topmost vertical position in the input document (and all data elements with vertical positions within some tolerance of the vertical position of that topmost element) to row 1, assigning the data element with the next highest vertical position (and all data elements within some tolerance of the vertical position of that data element) to row 2, and so on until rows had been assigned to all data elements. Of course, other approaches are also possible (e.g., assigning rows in a manner similar to that discussed below in the context of FIG. 3 for identifying columns), and will be immediately apparent to those of ordinary skill in the art in light of this disclosure, and so the exemplary approaches to assigning 202 rows described above should be understood as being illustrative only, and should not be treated as limiting.

Figure 3:
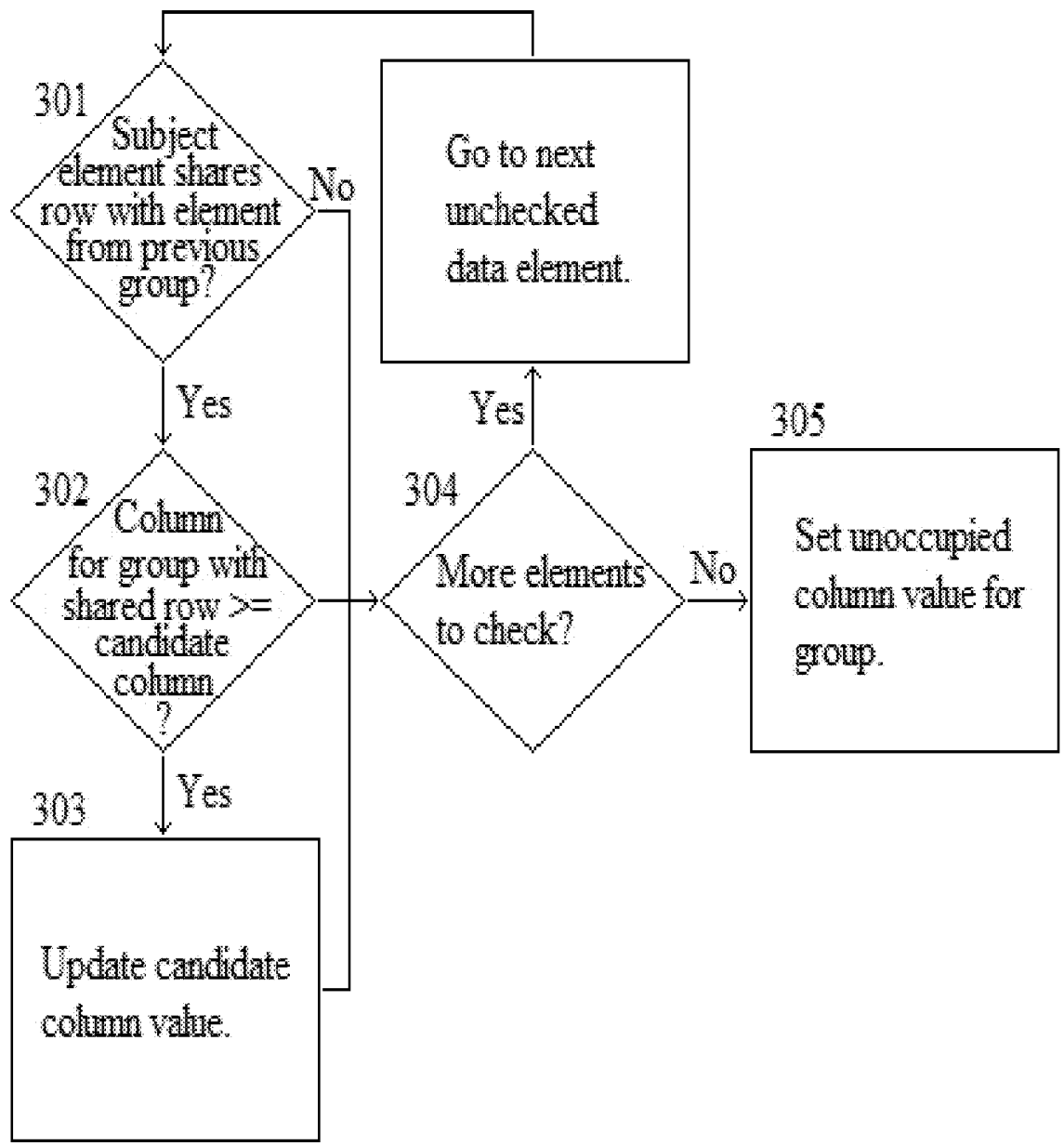
FIG. 3 illustrates a method which can be used for identifying a column for a group of data elements.

In the method of FIG. 2, after rows have been assigned 202, the method continues with finding 203 the next unoccupied column for the group under consideration. This may be done, for example, using a process such as shown in FIG. 3. In that process, starting with the first data element, each data element from the subject group could be checked 301 to see if that data element shared a row with a data element in a group that had already been processed and assigned a column. If the data element did share a row with a data element from a group that had already been processed and assigned to a column, and the column to which that group had been assigned was found 302 to be greater than or equal to a candidate column value for the group being processed, then the candidate column value for the group being processed could be updated 303 so that it was one more than the column that had been assigned to the group containing the element in the same row as the element being checked. Then, once it had been determined 304 that all data elements in the group being processed had been checked, the value for the next unoccupied column for the group under consideration could be set 305 equal to the candidate column value (or to 0, if the candidate column value was undefined).

Of course, other approaches to finding 203 unoccupied columns are possible, and could be included in embodiments of the disclosed technology by those of ordinary skill in the art. For example, in some embodiments, it is possible that a column identification process could detect if a group that had previously been assigned to a column had an equal (potentially within a certain tolerance) horizontal position with the horizontal position of the group being processed, and, if so, assign the group being processed to the same column as the previously processed group with the equal horizontal position. Similarly, in some embodiments, rather than assigning a group based on the column assignments of groups with data elements in the same row as those from the group being processed, it is possible that a group would simply be assigned to the next column that no other group had already been assigned to, regardless of whether any of the previously assigned groups had elements which shared rows with the elements of the group being processed. Combinations are also possible. For example, in some embodiments a group would be assigned to the next column that no other group had already been assigned to, except if the group being processed had a horizontal position equal to (potentially with some allowance made for error tolerances)

the horizontal position of a previously assigned group, in which case the group being processed could be assigned to the same column as the previously processed group which shared (at least approximately) its horizontal position. Accordingly, the description above of how unoccupied columns could be found 203 should be understood as being illustrative only, and should not be treated as limiting.

Returning now to the discussion of FIG. 2, after an unoccupied column has been found 203 for the group being processed, that group can be assigned 204 to that column. This could be done, for example, by updating a column assignment variable in a data structure representing that group, by actually adding the data elements in the group into a structured document (e.g., a spreadsheet) at the row and column locations determined previously, or in some other manner (e.g., updating multiple data structures representing individual data elements without actually adding those data elements into a structured document). This could be treated as the end of processing for a particular group, and a check 205 could then be made to determine if there were more groups which had not yet been processed. If there were, then the process could be repeated until a column had been assigned to each of the groups. Alternatively, if there were no further groups which remained to be processed, then the process could finish 206, such as by adding the data elements from each of the groups into a structured document at the appropriate column and row locations (assuming that population of the structured document had not already been performed, such as in the context of assigning 204 a group to its column).

While FIG. 2 illustrates a method which can be used to assign data elements to locations in a structured document, it should be understood that that method is provided as an example only, and that it should not be treated as implying limitations on the protection provided by this document or any related document. For example, it is possible that the disclosed technology could be used to implement a computer program that, rather than determining positions with a method involving finding 203 unoccupied columns, determined positions with a method that assigned columns by dividing the x coordinate of the rightmost (or leftmost, depending on the embodiment and how information in an input document was justified) portion of a data element by the average (or median or mode) length of data elements from the relevant input document.

Variations are also possible even in how embodiments which did feature identification of unidentified columns could be implemented. For example, in some embodiments, rather than identifying rows on a group by group basis, rows for all data elements could be identified as a preliminary step before any groups were assigned to columns. Similarly, in some cases, rows could be determined after columns had been assigned, such as where each new group was assigned to the leftmost unassigned column, as opposed to being assigned to a column based (at least in part) on what rows were occupied by data elements from already assigned groups. By that same token, in some implementations, a preliminary sorting 201 step could be omitted, and the processing of individual groups could include checks to see if those groups were the leftmost unprocessed groups, rather than assuming that the groups were ordered based on their positions. The basic process could also be horizontally reversed, with columns being assigned from right to left starting with some maximum column number, rather than left to right starting with some minimum column number (e.g., zero). Accordingly, like the discussion of finding unoccupied columns 203, the discussion of the overall method of FIG. 2 should be understood as being illustrative only, and should not be treated as being limiting.

Figure 4:
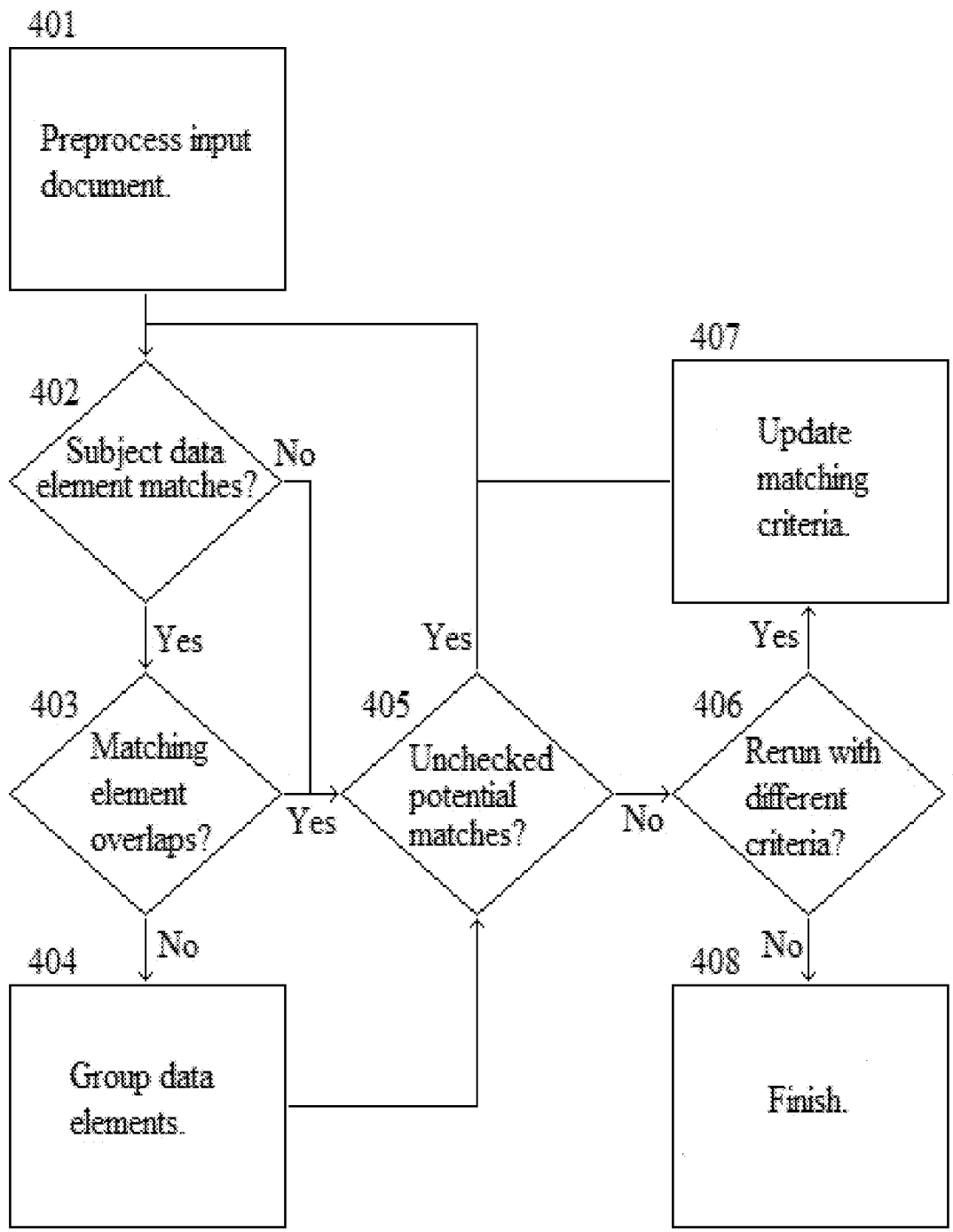
FIG. 4 illustrates a method which can be used to allocate data elements from an unstructured document into groups.

Turning now to FIG. 4, that figure illustrates a method by which data elements in an unstructured document (e.g., a PDF copy of a spreadsheet) could be allocated to groups such as those that could be assigned to columns using the method of FIG. 2. Initially, in the method of FIG. 4, the input document is pre-processed 401. This could include, for example, standardizing document format (e.g., changing all input documents to 1000 DPI so that standard values can be used in subsequent processing regardless of the input document's resolution), using optical character recognition to extract the text for each data element in the document (assuming that the input document did not already include embedded text), and generating data structures for the groups the data elements will be placed into. Initially, these group data structures may have a 1:1 relationship with the data elements—i.e., initially each element may be put into its own group. However, as described below, these groups may be winnowed and combined such that they will ultimately correspond to collections of data elements that can be treated as suitable for assignment to individual columns in a structured output document.

In the method of FIG. 4, the winnowing and combination begins with a determination 402 of whether a subject data element from a first group matches a data element from a second group. This may be done in a variety of manners. For example, in some embodiments, data elements will be treated as matching if they have the same horizontal position (e.g., their rightmost extents are exactly the same, or are the same to within some error tolerance), and the same content (e.g., they would return a value of true if evaluated with a string comparison function such as strcmp(const char*str1, const char*str2)). Alternatively, in some embodiments, data elements will be treated as matching if they have the same horizontal position, same horizontal extent, and represent the same type of data (e.g., are both numbers, are both dates, are both text strings, etc., such as could be found through application of regular expressions or other types of type identification rules) even if they do not have the same content. Other types of matching criteria are also possible, and could be used in various embodiments, depending on whether it would be preferable for a particular application to have smaller groups with more similar elements, or larger groups with less similar elements. To illustrate, further exemplary matching criteria are set forth below in table 1:

TABLE 1

Exemplary matching criteria

| | Position Requirement | Data Requirement | Extent Requirement |
|---|---|---|---|
| Criteria 1 | Match requires same horizontal position | Match requires same data | Match requires same horizontal extent (may be implicit in same content) |
| Criteria 2 | Match requires same horizontal position | Match requires same type of data | Match requires same horizontal extent |
| Criteria 3 | Match requires same horizontal position | Match requires same type of data | Match requires same horizontal extent within an allowable offset (allowable offset may be unlimited length) |

TABLE 1-continued

Exemplary matching criteria

| | Position Requirement | Data Requirement | Extent Requirement |
|---|---|---|---|
| Criteria 4 | Match requires same horizontal position | Match does not require same data or type of data | Match does not require same horizontal extent, even with an offset |
| Criteria 5 | Match requires same horizontal position within an allowable offset | Match does not require same data or type of data | Match does not require same horizontal extent, even with an offset |

After a determination 402 has been made of whether a subject data element from a first group matches a subject data element from a second group, a method such as shown in FIG. 4 could proceed with a further determination 403 of whether there is an overlap which should prevent the data element from the second group from being added to the first group. This may be done, for example, by checking if any data elements in the first group had neighbors that horizontally overlapped with any data elements in the second group (and/or, in some embodiments, if any data elements in the second group had neighbors that horizontally overlapped with any data elements in the first group). If there is a match and there is not an overlap, then the data elements may be grouped 404 together, such as by adding the data element from the second group into the first group and (since the second group would now be a subset of the first group) removing the data structure representing the second group as redundant. Then, if a check 405 indicates that there may be more data elements that could potentially be grouped together (e.g., because a data element in the first group may satisfy the matching criteria when compared with a data element in a third group, but the comparison which would establish that has not yet been performed), the process will proceed with checking the next potential match. This can then be repeated until all elements which satisfy the matching criteria and do not need to be separated based on a disqualifying overlap have been grouped together.

While it is possible that the disclosed technology could be used to implement a system which proceeds to column assignment once all potential matches had been checked, it is preferable that, after the group combination and winnowing described above has been performed with a given matching criteria, the matching criteria would be loosened and the process would be repeated with the looser criteria. In FIG. 4, this is illustrated with the check 406 of whether the winnowing and combining steps 402-405 described above should be rerun with a different matching criteria. In practice, such a check 406 may be performed by referring to a pre-configured set of criteria, and indicating that the winnowing and combination should be rerun with a new criteria as long as at least one of the pre-configured criteria had not yet been applied. Of course, other types of checks are also possible. For example, in some implementations, a check could be performed based on whether it appeared that repeating the winnowing and combination would result in further consolidation (e.g., because the number of groups had not hit a plateau which remained stable after several winnowing and combination iterations and/or because the winnowing and combination hadn't hit a block like a forbidden overlap which was likely to remain despite changes in matching criteria).

However it is performed, in embodiments where there is a check 406 of whether to rerun with different matching criteria, if that check 406 indicates that the process should be rerun, then the matching criteria could be updated 407 (e.g., changed to the next item in a set of pre-configured criteria) and the process could repeat with the updated criteria. Alternatively, if the check 406 indicated that the process did not need to be rerun (or if the embodiment in question was one which didn't repeat with different matching criteria), the process of FIG. 4 could finish 408, and the final groups could be provided as input to a column assignment process such as shown in FIG. 2.

While the above discussion of grouping data elements from an input document described various alternative approaches to implementing a grouping process, it should be understood that those alternatives are intended to be illustrative, and should not be treated as an exhaustive catalog of ways in which embodiments which include a grouping process may differ in how that process is implemented. As an illustration of a further type of variation which may exist between different embodiments, consider that some implementations of a grouping process may be designed to take advantage of existing groups. For instance, in some embodiments, data structures representing groups may include not only individual data elements (or references to data elements, depending on the implementation), but also may include data that could be used in comparisons, such as the horizontal range (e.g., farthest left and farthest right points) covered by the group's data elements, and the horizontal range of the whitespace on the left and right of the group. In this type of implementation, it is possible that at least some checks (e.g., of whether there is an impermissible horizontal overlap) would be performed on a group level, and if those checks were passed then entire groups would be combined as opposed to simply adding individual matching elements.

Further, it is also possible that aspects of the disclosed technology could be used to implement systems where grouping takes place on levels of abstraction other than data elements. To illustrate, consider how one of ordinary skill in the art could use grouping on the level of rows, rather than at the level of data elements, to organize information from an input document. In this type of embodiment, rows in an input document may be grouped together based on their text and whitespace areas (e.g., two rows could be put into a group if they had the same number of text and whitespace areas, and no text area from either row overlapped more than one text area in the other row) and then the whitespace in the rows could be used to define columns, despite the fact that that whitespace may not be vertically continuous in the original input document. Variations on row based grouping are also possible (e.g., iterative grouping where groups would be built based on application of progressively more inclusive criteria, grouping which separates rows into subsets of elements that appear to match across rows but would still feature more aggregation than the individual data elements) are also possible, and could be implemented by those of ordinary skill in the art without undue experimentation in light of this disclosure.

As a concrete illustration of how a grouping process which performed (at least some) combination and checking at the group level rather than the level of individual elements, consider FIG. 5. FIG. 5 depicts an input document with dashed lines to illustrate the locations of the minimum and maximum horizontal positions and the vertical positions of each of the data elements in that document (it should be noted that such dashed lines would not generally be expected to be included in an input document, and are included in FIG. 5 solely to facilitate the discussion of how that document might be processed). As discussed previously, preferably each of the data elements from the input document is assigned to its own group, and when matching is done at a group level, each group may be associated with data showing its elements' horizontal range and the horizontal ranges of the whitespace on the sides of its elements. An example of what these initial groups might look like for the input document of FIG. 5 is presented below in table 2.

TABLE 2

Exemplary initial groupings, in which Min refers to the leftmost possible horizontal position and Max refers to the rightmost possible horizontal position. Vertical positions included in parentheses to help distinguish data with identical content.

| | Data elements in group | Horizontal range of preceding whitespace | Horizontal range of data elements | Horizontal range of subsequent whitespace |
|---|---|---|---|---|
| Group 1 | **** 100 ($Y_1$) | Min-$X_1$ | $X_1$-$X_3$ | $X_3$-Max |
| Group 2 | Apr. 15, 2015 ($Y_2$) | Min-$X_1$ | $X_1$-$X_2$ | $X_2$-Max |
| Group 3 | Apr. 15, 2015 ($Y_3$) | Min-$X_1$ | $X_1$-$X_2$ | $X_2$-Max |
| Group 4 | May 8, 2015 ($Y_4$) | Min-$X_1$ | $X_1$-$X_2$ | $X_2$-Max |
| Group 5 | May 8, 2015 ($Y_5$) | Min-$X_1$ | $X_1$-$X_2$ | $X_2$-Max |
| Group 6 | **** 102 FACILITY MGR ($Y_6$) | Min-$X_1$ | $X_1$-$X_6$ | $X_6$-Max |
| Group 7 | Apr. 15, 2015 ($Y_7$) | Min-$X_1$ | $X_1$-$X_2$ | $X_2$-Max |
| Group 8 | Apr. 15, 2015 ($Y_8$) | Min-$X_1$ | $X_1$-$X_2$ | $X_2$-$X_7$ |
| Group 9 | May 8, 2015 ($Y_9$) | Min-$X_1$ | $X_1$-$X_2$ | $X_2$-Max |
| Group 10 | May 8, 2015 ($Y_{10}$) | Min-$X_1$ | $X_1$-$X_2$ | $X_2$-$X_4$ |
| Group 11 | **** CHILD CARE WORKERS ($Y_{11}$) | Min-$X_1$ | $X_1$-$X_8$ | $X_8$-Max |
| Group 12 | Apr. 15, 2015 ($Y_{12}$) | Min-$X_1$ | $X_1$-$X_2$ | $X_2$-$X_4$ |
| Group 13 | Apr. 15, 2015 ($Y_{13}$) | Min-$X_1$ | $X_1$-$X_2$ | $X_2$-$X_4$ |
| Group 14 | May 8, 2015 ($Y_{14}$) | Min-$X_1$ | $X_1$-$X_2$ | $X_2$-$X_4$ |
| Group 15 | May 8, 2015 ($Y_{15}$) | Min-$X_1$ | $X_1$-$X_2$ | $X_2$-$X_4$ |
| Group 16 | 544.50 ($Y_{10}$) | $X_2$-$X_4$ | $X_4$-$X_5$ | $X_5$-Max |
| Group 17 | 544.50 ($Y_{12}$) | $X_2$-$X_4$ | $X_4$-$X_5$ | $X_5$-$X_7$ |
| Group 18 | 546.00 ($Y_{13}$) | $X_2$-$X_4$ | $X_4$-$X_5$ | $X_5$-$X_7$ |
| Group 19 | 544.50 ($Y_{14}$) | $X_2$-$X_4$ | $X_4$-$X_5$ | $X_5$-Max |
| Group 20 | 546.00 ($Y_{15}$) | $X_2$-$X_4$ | $X_4$-$X_5$ | $X_5$-Max |
| Group 21 | 3.00 ($Y_8$) | $X_2$-$X_7$ | $X_7$-$X_9$ | $X_9$-Max |
| Group 22 | 6.00 ($Y_{12}$) | $X_5$-$X_7$ | $X_7$-$X_9$ | $X_9$-Max |
| Group 23 | 3.00 ($Y_{13}$) | $X_5$-$X_7$ | $X_7$-$X_9$ | $X_9$-Max |
| Group 24 | 3.00 ($Y_{16}$) | Min-$X_7$ | $X_7$-$X_9$ | $X_9$-Max |

To winnow and combine these groups, a system implemented to use a method such as illustrated in FIG. 4 with matching criteria such as shown in table 1 could begin by comparing the groups and seeing if there were any matches using criteria 1. For group 1, this would result in no matches, because group 1 does not match any other group when criteria 1 is applied. After no matches are found for group 1, a similar search for matches could be performed for group 2, by comparing it with the remaining groups that had not yet been evaluated (i.e., groups 3-24). In this iteration of the winnowing and combination, group 2 would be found to match with groups 3, 7, 8, 12 and 13. As a result, the data elements from those groups could be added to group 2, and groups 3, 7, 8, 12 and 13 could be eliminated as redundant, providing an updated set of groups such as shown below in table 3.

TABLE 3

Exemplary intermediate groupings after an initial combination and winnowing pass has been completed for group 2. Note that in the course of the combination and winnowing, the horizontal range of the subsequent whitespace has been changed for group 2 to reflect the minimum subsequent whitespace for any of the elements included in that group.

| | Data elements in group | Horizontal range of preceding whitespace | Horizontal range of data elements | Horizontal range of subsequent whitespace |
|---|---|---|---|---|
| Group 1 | **** 100 ($Y_1$) | Min-$X_1$ | $X_1$-$X_3$ | $X_3$-Max |
| Group 2 | Apr. 15, 2015 ($Y_2$) Apr. 15, 2015 ($Y_3$) Apr. 15, 2015 ($Y_7$) Apr. 15, 2015 ($Y_8$) Apr. 15, 2015 ($Y_{12}$) Apr. 15, 2015 ($Y_{13}$) | Min-$X_1$ | $X_1$-$X_2$ | $X_2$-$X_4$ |
| Group 4 | May 8, 2015 ($Y_4$) | Min-$X_1$ | $X_1$-$X_2$ | $X_2$-Max |
| Group 5 | May 8, 2015 ($Y_5$) | Min-$X_1$ | $X_1$-$X_2$ | $X_2$-Max |
| Group 6 | **** 102 FACILITY MGR ($Y_6$) | Min-$X_1$ | $X_1$-$X_6$ | $X_6$-Max |
| Group 9 | May 8, 2015 ($Y_9$) | Min-$X_1$ | $X_1$-$X_2$ | $X_2$-Max |
| Group 10 | May 8, 2015 ($Y_{10}$) | Min-$X_1$ | $X_1$-$X_2$ | $X_2$-$X_4$ |
| Group 11 | **** CHILD CARE WORKERS ($Y_{11}$) | Min-$X_1$ | $X_1$-$X_8$ | $X_8$-Max |
| Group 14 | May 8, 2015 ($Y_{14}$) | Min-$X_1$ | $X_1$-$X_2$ | $X_2$-$X_4$ |
| Group 15 | May 8, 2015 ($Y_{15}$) | Min-$X_1$ | $X_1$-$X_2$ | $X_2$-$X_4$ |
| Group 16 | 544.50 ($Y_{10}$) | $X_2$-$X_4$ | $X_4$-$X_5$ | $X_5$-Max |
| Group 17 | 544.50 ($Y_{12}$) | $X_2$-$X_4$ | $X_4$-$X_5$ | $X_5$-$X_7$ |
| Group 18 | 546.00 ($Y_{13}$) | $X_2$-$X_4$ | $X_4$-$X_5$ | $X_5$-$X_7$ |
| Group 19 | 544.50 ($Y_{14}$) | $X_2$-$X_4$ | $X_4$-$X_5$ | $X_5$-Max |
| Group 20 | 546.00 ($Y_{15}$) | $X_2$-$X_4$ | $X_4$-$X_5$ | $X_5$-Max |
| Group 21 | 3.00 ($Y_8$) | $X_2$-$X_7$ | $X_7$-$X_9$ | $X_9$-Max |
| Group 22 | 6.00 ($Y_{12}$) | $X_5$-$X_7$ | $X_7$-$X_9$ | $X_9$-Max |
| Group 23 | 3.00 ($Y_{13}$) | $X_5$-$X_7$ | $X_7$-$X_9$ | $X_9$-Max |
| Group 24 | 3.00 ($Y_{16}$) | Min-$X_7$ | $X_7$-$X_9$ | $X_9$-Max |

Other groups could be treated similarly. For example, after the combination and winnowing had been completed using criteria 1 to find matches for group 2, the next unevaluated group (which, in this example, would be group 4, since group 3 had been combined with group 2) could be compared with the remaining groups (i.e., groups 5, 6, 9-10, 11, and 14-24), and so on until all potential matches had been checked. Table 4, below, illustrates how the data elements from the input document of FIG. 5 could be grouped after combination and winnowing based on criteria 1 had been completed for each of the input document's groups.

TABLE 4

Exemplary groupings which could result from performing winnowing and combination such as described in the context of FIG. 4 using criteria 1 for all groupings for the input document of FIG. 5.

| | Data elements in group | Horizontal range of preceding whitespace | Horizontal range of data elements | Horizontal range of subsequent whitespace |
|---|---|---|---|---|
| Group 1 | **** 100 ($Y_1$) | Min-$X_1$ | $X_1$-$X_3$ | $X_3$-Max |
| Group 2 | Apr. 15, 2015 ($Y_2$) Apr. 15, 2015 ($Y_3$) Apr. 15, 2015 ($Y_7$) Apr. 15, 2015 ($Y_8$) Apr. 15, 2015 ($Y_{12}$) Apr. 15, 2015 ($Y_{13}$) | Min-$X_1$ | $X_1$-$X_2$ | $X_2$-$X_4$ |
| Group 4 | May 8, 2015 ($Y_4$) May 8, 2015 ($Y_5$) May 8, 2015 ($Y_9$) May 8, 2015 ($Y_{10}$) | Min-$X_1$ | $X_1$-$X_2$ | $X_2$-$X_4$ |

TABLE 4-continued

Exemplary groupings which could result from performing winnowing and combination such as described in the context of FIG. 4 using criteria 1 for all groupings for the input document of FIG. 5.

| | Data elements in group | Horizontal range of preceding whitespace | Horizontal range of data elements | Horizontal range of subsequent whitespace |
|---|---|---|---|---|
| | May 8, 2015 ($Y_{14}$) | | | |
| | May 8, 2015 ($Y_{15}$) | | | |
| Group 6 | **** 102 FACILITY MGR ($Y_6$) | Min-$X_1$ | $X_1$-$X_6$ | $X_6$-Max |
| Group 11 | **** CHILD CARE WORKERS ($Y_{11}$) | Min-$X_1$ | $X_1$-$X_8$ | $X_8$-Max |
| Group 16 | 544.50 ($Y_{10}$) 544.50 ($Y_{12}$) 544.50 ($Y_{14}$) | $X_2$-$X_4$ | $X_4$-$X_5$ | $X_5$-Max |
| Group 18 | 546.00 ($Y_{13}$) 546.00 ($Y_{15}$) | $X_2$-$X_4$ | $X_4$-$X_5$ | $X_5$-$X_7$ |
| Group 21 | 3.00 ($Y_8$) 3.00 ($Y_{13}$) 3.00 ($Y_{16}$) | $X_2$-$X_7$ | $X_7$-$X_9$ | $X_9$-Max |
| Group 22 | 6.00 ($Y_{12}$) | $X_5$-$X_7$ | $X_7$-$X_9$ | $X_9$-Max |

After the winnowing and combination has been performed for all groups with criteria 1, a process such as shown in FIG. 4 could continue by repeating that process for the remaining groups with criteria 2. On this second pass, as with the first pass, group 1 may not be found to match any other groups, since satisfying criteria 2 requires the same horizontal extent, and no group other than group 1 has a horizontal extent of $|X_1-X_3|$. However, group 2 would be found to match group 4, since they have the same horizontal extent (i.e., $|X_1-X_2|$), same horizontal position ($X_1$, assuming that horizontal position is measured from the leftmost pixel), and same data type (i.e., dates). Accordingly, when this match was discovered, all data elements from group 4 could be added to group 2, and group 4 could be removed as redundant. This matching based on criteria 2 could then be repeated for the remaining groups, resulting in a revised grouping such as shown below in table 5:

TABLE 5

Exemplary grouping which could be obtained after applying a matching criteria which considers type of data.

| | Data elements in group | Horizontal range of preceding whitespace | Horizontal range of data elements | Horizontal range of subsequent whitespace |
|---|---|---|---|---|
| Group 1 | **** 100 ($Y_1$) | Min-$X_1$ | $X_1$-$X_3$ | $X_3$-Max |
| Group 2 | Apr. 15, 2015 ($Y_2$) Apr. 15, 2015 ($Y_3$) Apr. 15, 2015 ($Y_7$) Apr. 15, 2015 ($Y_8$) Apr. 15, 2015 ($Y_{12}$) Apr. 15, 2015 ($Y_{13}$) May 8, 2015 ($Y_4$) May 8, 2015 ($Y_5$) May 8, 2015 ($Y_9$) May 8, 2015 ($Y_{10}$) May 8, 2015 ($Y_{14}$) May 8, 2015 ($Y_{15}$) | Min-$X_1$ | $X_1$-$X_2$ | $X_2$-$X_4$ |
| Group 6 | **** 102 FACILITY MGR ($Y_6$) | Min-$X_1$ | $X_1$-$X_6$ | $X_6$-Max |

TABLE 5-continued

Exemplary grouping which could be obtained after applying a matching criteria which considers type of data.

| | Data elements in group | Horizontal range of preceding whitespace | Horizontal range of data elements | Horizontal range of subsequent whitespace |
|---|---|---|---|---|
| Group 11 | **** CHILD CARE WORKERS ($Y_{11}$) | Min-$X_1$ | $X_1$-$X_8$ | $X_8$-Max |
| Group 16 | 544.50 ($Y_{10}$) 544.50 ($Y_{12}$) 544.50 ($Y_{14}$) 546.00 ($Y_{13}$) 546.00 ($Y_{15}$) | $X_2$-$X_4$ | $X_4$-$X_5$ | $X_5$-$X_7$ |
| Group 21 | 3.00 ($Y_8$) 3.00 ($Y_{13}$) 3.00 ($Y_{16}$) 6.00 ($Y_{12}$) | $X_5$-$X_7$ | $X_7$-$X_9$ | $X_9$-Max |

After completing the winnowing and combination based on matches using criteria 2, a system following a process such as shown in FIG. 4 could continue by looking for further matches using criteria 3. As indicated in table 1, satisfaction of criteria 3 requires same horizontal position, same data type, and same horizontal extent to within some allowable offset (again, with same potentially including values which differ from each other by some small tolerance value to account for scanning errors or similar inaccuracies). Accordingly, the result of winnowing and combination using criteria 3 may change based on the allowable offset which is used to evaluate horizontal extent. For instance, in the current example, if the allowable offset is greater than or equal to $|X_6-X_3|$ then at least group 6 (and preferably also group 11) will be added to group 3, if the allowable offset is between $|X_8-X_6|$ and $|X_6-X_3|$ then group 6 will be combined with group 11 but group 1 will be left unchanged, while if the allowable offset is less than $|X_8-X_6|$ then none of the groups will be combined. To account for this, some embodiments that apply a matching criteria that considers matches to within allowable offsets may repeatedly apply that criteria with greater offsets each time (e.g., starting with an offset of 50, then increasing the offset in increments of 50). In embodiments where it is present, such offset increases may progress up to a predefined limit (e.g., 500), after which the criteria may be considered fully evaluated, or after which a final check may be made that doesn't consider the parameter which had been impacted by the offsets (i.e., effectively applying an offset of ∞). An updated grouping showing how the groups for the input document of FIG. 5 may be updated after applying criteria 3 with either a progressively increasing offset or an offset that is initially large enough to result in groups 1, 6 and 11 being combined is provided below in table 6.

TABLE 6

Exemplary grouping which could be obtained after relaxing constraints on horizontal extent.

| | Data elements in group | Horizontal range of preceding whitespace | Horizontal range of data elements | Horizontal range of subsequent whitespace |
|---|---|---|---|---|
| Group 1 | **** 100 ($Y_1$) **** 102 | Min-$X_1$ | $X_1$-$X_8$ | $X_8$-Max |

TABLE 6-continued

Exemplary grouping which could be obtained after relaxing constraints on horizontal extent.

|  | Data elements in group | Horizontal range of preceding whitespace | Horizontal range of data elements | Horizontal range of subsequent whitespace |
|---|---|---|---|---|
|  | FACILITY MGR ($Y_6$) **** CHILD CARE WORKERS ($Y_{11}$) |  |  |  |
| Group 2 | Apr. 15, 2015 ($Y_2$) Apr. 15, 2015 ($Y_3$) Apr. 15, 2015 ($Y_7$) Apr. 15, 2015 ($Y_8$) Apr. 15, 2015 ($Y_{12}$) Apr. 15, 2015 ($Y_{13}$) May 8, 2015 ($Y_4$) May 8, 2015 ($Y_5$) May 8, 2015 ($Y_9$) May 8, 2015 ($Y_{10}$) May 8, 2015 ($Y_{14}$) May 8, 2015 ($Y_{15}$) | Min-$X_1$ | $X_1$-$X_2$ | $X_2$-$X_4$ |
| Group 16 | 544.50 ($Y_{10}$) 544.50 ($Y_{12}$) 544.50 ($Y_{14}$) 546.00 ($Y_{13}$) 546.00 ($Y_{15}$) | $X_2$-$X_4$ | $X_4$-$X_5$ | $X_5$-$X_7$ |
| Group 21 | 3.00 ($Y_8$) 3.00 ($Y_{13}$) 3.00 ($Y_{16}$) 6.00 ($Y_{12}$) | $X_5$-$X_7$ | $X_7$-$X_9$ | $X_9$-Max |

Of course, it should be understood that, even in embodiments which use varying offsets such as described above, different ways of varying the offsets may be used, and so the constant incrementing described above should be understood as being illustrative only, and should not be treated as limiting. For example, in some embodiments, rather than increasing offsets by a constant amount, some embodiments might determine offset increases based on the differences in the relevant parameter between values in the document being processed. Thus, for increasing offsets in the example document of FIG. 5, some embodiments might start by setting the allowable offset at $\|X_9-X_7|-|X_5-X_4\|$ (i.e., the difference between the two smallest horizontal extents), then increasing the allowable offset by $\|X_2-X_1|-|X_5-X_4\|$ (i.e., the difference between the next smallest extents), and so on for the remaining extent differences. Other approaches (e.g., applying a binary search-like algorithm to identify the minimum offset that would result in any groups being combined and using that as an increment) are also possible and will be immediately apparent to those of ordinary skill in the art in light of this disclosure. Accordingly, the above discussion of offset increases should not be treated as being limiting on the scope of protection provided by this or any related document.

After criteria 3, a system implementing a process such as shown in FIG. 4 could proceed with criteria 4, treating data elements as matching if they have the same horizontal position regardless of their horizontal extent or data. Initially, when applying this criteria, a match may be identified between groups 1 and 2, since those groups both have a horizontal position (defined, for the purpose of this illustration, as the leftmost extent of any of the data elements in a group) of $X_1$. However, preferably, despite this match groups 1 and 2 will not be combined, because at least one of the elements in group 2 has a neighbor that overlaps at least one of the elements in group 1, as reflected in the fact that maximum horizontal extent of group 1 (i.e., $X_8$) is greater than the rightmost extent of the whitespace which follows group 2 (i.e., $X_4$). As a result, the application of criteria 4 would preferably not result in any groups being combined, even though groups 1 and 2 would match when compared using that criteria. The effect of applying criteria 5, which is satisfied if horizontal positions are the same within an allowable offset, would be similar (i.e., no change in grouping). Indeed, even if a criteria were applied which was automatically satisfied (i.e., always true for every pair of groups), no further changes would be made to the grouping of table 6, because each pair of groups would have a disqualifying overlap.

As described above, by applying a method such as shown in FIG. 4 to an input document such as shown in FIG. 5, the data elements in the input document can be automatically assigned to groups that may allow their relevant relationships to be represented in a structured output document despite the lack of vertically contiguous whitespace or other similar cues. For example, when the groups of table 6 are assigned to columns (e.g., using a process such as shown in the context of FIGS. 2 and 3), groups 16 and 21 can be placed into separate columns even though those groups were not separated by vertically continuous whitespace in the input document. Similarly, the data elements having the value 3.00 at vertical positions $Y_8$ and $Y_{16}$ can be placed in a column to the right of the data elements with values 544.50 and 546.00, despite the fact that there are no data elements with values 544.50 or 546.00 at vertical positions $Y_8$ or $Y_{16}$, because of the placement of the data elements with the value 3.00 at vertical positions $Y_8$ and $Y_{16}$ in group 21. Accordingly, the disclosed technology may allow for extraction and organization of data in input documents which previous technology may not have been able to properly handle (e.g., input documents with internal headers).

Figure 6:
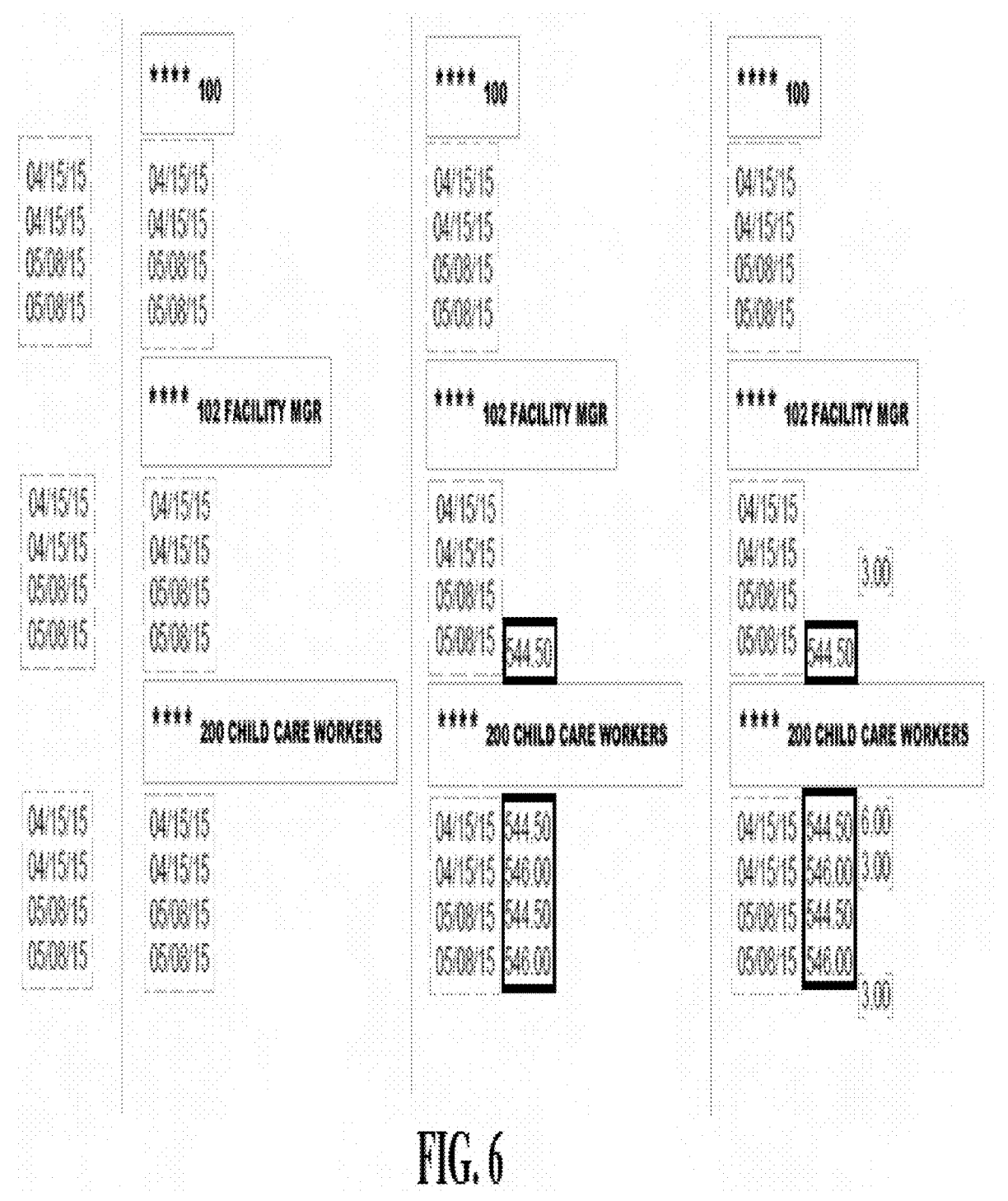

Turning now to FIG. 6, that figure illustrates how groups such as shown in table 6 could be assigned to columns using processing such as illustrated in FIGS. 2 and 3 (after sorting 201, which would result in group 1 being assigned to a column before group 2). Initially, as shown in FIG. 6, group 2 would be assigned to the leftmost column, because no data elements in that column shared rows with other data elements from groups which had already been assigned. Similarly, group 1 would also be assigned to the leftmost column, because, even though group 2 had already been assigned, no data elements in group 2 share a row with a data element in group 1, and so there is no overlap which would prevent both groups 2 and 1 from being placed into a single column. However, there are row level overlaps between groups 2 and 16, and so, as shown in FIG. 6, on the third iteration group 16 would be assigned to the second leftmost column, even though group 1 included data elements with rightmost edges farther to the right than data elements in group 16. Finally, group 21 would be assigned to the third leftmost column, ultimately resulting in relative positioning such as shown in the rightmost portion of FIG. 6.

While the disclosed technology could be applied in a variety of contexts, one preferred application would be the population of a spreadsheet or relational database with information from one or more input documents provided in PDF or other similar format. In such an application, the input document(s) may be provided on a portable hard drive, uploaded to a network location, provided on a thumb drive, etc. These input documents could then be stored (either temporarily or permanently) in a memory accessible to a computer system comprising one or more non-transitory computer readable mediums encoded with instructions for performing processes such as discussed previously and one or more processors for executing those instructions. The computer system could then execute the instructions and process the input documents to generate the appropriate structured output, preferably by copying portions of the input documents into memory which was used for data manipulation (e.g., random access memory, registers, etc.) and then sending the generated output to some type of non-volatile storage (e.g., an external database). With that said, other potential applications of the disclosed technology are also possible, and so the examples provided should be understood as being illustrative only, and should not be treated as limiting.

In light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "based on" should be understood to mean that something is determined at least in part by the thing that it is indicated as being "based on." When a claim is written to require something must be completely determined by a thing, it will be described as being "based EXCLUSIVELY on" the thing.

When used in the claims, a "channel" should be understood to refer to a medium through which information may be transmitted from an origin to a destination. Information transmitted may be in a form such as a solid, a pulse of electromagnetic radiation, an electrical signal, or other tangible or intangible forms.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "first," "second" and other modifiers which precede nouns or noun phrases should be understood as being labels which are intended to improve the readability of the claims, and should not be treated as limitations. For example, references to a "first communication server" and a "second communication server" should not be understood as requiring that one of the recited servers precedes the other in time, priority, network location, or any other manner.

When used in the claims, a statement that a subject data element has data "matching" an existing group should be understood to mean that, when considered on a piece by piece basis (e.g., when a character string is considered on a character by character basis) each data element in the existing group will match the subject data element (e.g., if the subject data element is the word cat, then each data element in the existing group will also be the word cat).

When used in the claims, a statement that a subject data element has a data type "matching" an existing group should be understood to mean that each data element in the existing group can be put into a category that also includes the subject data element.

When used in the claims, "means for assigning columns to data elements from the input document based on the set of groups" should be understood as a means+function limitation as provided for in 35 U.S.C. § 112(f), in which the function is "assigning columns to data elements from the input document based on the set of groups" and the corresponding structure is a computer configured to perform processes as illustrated in FIGS. 2, 3 and 6, and described in paragraphs 17-23, 30 and 39 of this document.

When used in the claims, "means for grouping data elements from an input document into a set of groups based on satisfaction of matching criteria and testing for horizontal overlaps between data elements and neighbors of other data elements" should be understood as a means+function limitation as provided for in 35 U.S.C. § 112(f), in which the function is "grouping data elements from an input document into a set of groups based on satisfaction of matching criteria and testing for horizontal overlaps between data elements and neighbors of other data elements" and the corresponding structure is a computer configured to perform processes as illustrated in FIG. 4 from steps 402 onward and described in paragraphs 25-38 of this document.

When used in the claims, "neighbor" of a data element should be understood to refer to the closest data element in the indicated direction, or, if there is no data element in the indicated direction, the edge of a document in that direction. For example, a data element's left neighbor should be understood as referring to the data element which matches vertically and is to the left of the subject data element or, if there is no vertically matching data element to the left of the subject data element, then the left edge of the document in which the subject data element appears.

When used in the claims, "provide" should be understood to mean causing the thing to which something is provided to have that thing, either directly or indirectly. For example, a server could "provide" a set of instructions to a remote computing device by sending the set of instructions directly to the remote computing device, and could also "provide" the set of instructions to the remote computing device by sending the remote computing device data which would cause the remote computing device to send a message to an external system which would respond to the message by sending the set of instructions to the remote computing device.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

What is claimed is:

1. A system comprising a computer configured with instructions encoded on a non-transitory computer readable medium, the instructions operable to, when executed, cause the computer to perform a set of acts comprising:
   a) obtaining a plurality of data elements from an input document corresponding to information for rows and columns in a structured output document;
   b) generating a set of data element groups based on applying a set of matching criteria to the data elements after the data elements have been assigned to a set of existing groups, each of which comprises one or more data elements, and testing for horizontal overlaps between neighbors of data elements in a first existing group and data elements in a second existing group and combining the first and second existing groups based on determining the existence of a match and absence of neighbor overlap between the first and second existing groups; and
   c) assigning the data elements to columns based on the set of data element groups to generate the structured output document with columns having data elements separated from data elements in neighboring columns by whitespace and extending vertically across any internal headings in the one or more input documents regardless of whether the internal headings cause vertical whitespace between neighboring columns to be discontinuous.

2. The system of claim 1, wherein generating the set of data element groups based on applying the set of matching criteria comprises applying a first matching criterion to the plurality of data elements and subsequently applying a second matching criterion to the plurality of data elements, wherein all data elements that satisfy the first matching criteria also satisfy the second matching criteria.

3. The system of claim 2, wherein:
   a) the first matching criterion is satisfied based on matching data and horizontal position;
   b) the second matching criterion is satisfied based on matching data type, horizontal position and horizontal extent; and
   c) the set of matching criteria comprises:
      i) a third matching criterion satisfied based on matching data type, horizontal position, and horizontal extent within an extent offset;
      ii) a fourth matching criterion satisfied based on matching horizontal position; and
      iii) a fifth matching criterion satisfied based on matching horizontal position within a position offset;
   wherein the first, second and third matching criteria are applied by matching existing groups against each other.

4. The system of claim 3, wherein generating the set of data element groups based on applying the set of matching criteria comprises applying the third matching criterion at least two times using different extent offsets.

5. The system of claim 1, wherein:
   a) existing groups that would be tested for horizontal overlaps during performance of the set of acts by the computer would each be associated with:
      i) a preceding whitespace extent that includes only whitespace between data elements within that group and that group's data elements' left neighbors;
      ii) a data element extent that horizontally encompasses all data elements comprised within that group; and
      iii) a subsequent whitespace extent that includes only whitespace between data elements within that group and that group's data elements' right neighbors; and
   b) testing for horizontal overlaps between data elements and neighbors of data elements in existing groups by the computer would be performed based on:
      i) comparing the data element extent of a first existing group with the preceding whitespace extent and subsequent whitespace extent of a second existing group; and
      ii) comparing the data element extent of the second existing group with the preceding whitespace and subsequent whitespace extent of the first existing group.

6. The system of claim 1, wherein assigning the data elements to columns based on the set of data element groups comprises applying the data element groups to columns of the output document by, for each group from the set of data element groups:
   a) determining if any data element in that group shares a row with any data element in any other group that has already been applied to a column; and
   b) in the event that any data element in that group shares a row with any data element in any other group that has already been applied to a column, apply that group to a first column to the right of a rightmost column assigned to a group comprising a data element in a shared row.

7. A method for automatically organizing data from one or more input documents into rows and columns in a structured output document, the method comprising:
   a) obtaining a set of matching criteria that define matches between data elements;

b) obtaining a plurality of data elements from an input document corresponding to information for rows and columns in the structured output document;

c) generating a set of data element groups based on applying the set of matching criteria to the data elements after the data elements have been assigned to a set of existing groups, each of which comprises one or more data elements, and testing for horizontal overlaps between neighbors of data elements in a first existing group and data elements in a second existing group and combining the first and second existing groups based on determining the existence of a match and absence of neighbor overlap between the first and second existing groups; and d) assigning the data elements to columns of the output document based on the set of data element groups to generate a structured output document with columns having data elements separated from data elements in neighboring columns by whitespace and extending vertically across any internal headings in the one or more input documents regardless of whether the internal subheadings cause vertical whitespace between neighboring columns to be discontinuous.

8. The method of claim 7, wherein generating the set of data element groups based on applying the set of matching criteria comprises applying a first matching criterion to the plurality of data elements and subsequently applying a second matching criterion to the plurality of data elements, wherein all data elements that satisfy the first matching criteria also satisfy the second matching criteria.

9. The method of claim 8, wherein:

a) the first matching criterion is satisfied based on matching data and horizontal position;

b) the second matching criterion is satisfied based on matching data type, horizontal position and horizontal extent; and c) the set of matching criteria comprises:

i) a third matching criterion satisfied based on matching data type, horizontal position, and horizontal extent within an extent offset;

ii) a fourth matching criterion satisfied based on matching horizontal position; and iii) a fifth matching criterion satisfied based on matching horizontal position within a position offset;

wherein the first, second and third matching criteria are applied by matching existing groups against each other.

10. The method of claim 9, wherein generating the set of data element groups based on applying the set of matching criteria comprises applying the third matching criterion at least two times using different extent offsets.

11. The method of claim 7, wherein:

a) existing groups that are tested for horizontal overlaps are associated with:

i) a preceding whitespace extent that includes only whitespace between data elements by within that group and that group's data elements' left neighbors;

ii) a data element extent that horizontally encompasses all data elements comprised within that group; and iii) a subsequent whitespace extent that includes only whitespace between data elements within that group and that group's data elements' right neighbors; and b) testing for horizontal overlaps between data elements and neighbors of data elements in existing groups is performed based on:

i) comparing the data element extent of a first existing group with the preceding whitespace extent and subsequent whitespace extent of a second existing group; and ii) comparing the data element extent of the second existing group with the preceding whitespace and subsequent whitespace extent of the first existing group.

12. The method of claim 7, wherein the data element groups are applied to columns of the output document by, for each group from the set of data element groups:

a) determining if any data element in that group shares a row with any data element in any other group that has already been applied to a column; and b) in the event that any data element in that group shares a row with any data element in any other group that has already been applied to a column, apply that group to a first column to the right of a rightmost column assigned to a group comprising a data element in a shared row.

13. A non-transitory computer readable medium encoded with instructions operable to, when executed, cause a computer to perform a set of acts comprising:

a) obtaining a plurality of data elements from an input document corresponding to information for rows and columns in a structured output document;

b) generating a set of data element groups based on applying a set of matching criteria to the data elements after the data elements have been assigned to a set of existing groups, each of which comprises one or more data elements, and testing for horizontal overlaps between neighbors of data elements in a first existing group and data elements in a second existing group and combining the first and second existing groups based on determining the existence of a match and absence of neighbor overlap between the first and second existing groups; and c) assigning the data elements to columns based on the set of data element groups to generate the structured output document with columns having data elements separated from data elements in neighboring columns by whitespace and extending vertically across any internal headings in the one or more input documents regardless of whether the internal headings cause vertical whitespace between neighboring columns to be discontinuous.

14. The non-transitory computer readable medium of claim 13, wherein generating the set of data element groups based on applying the set of matching criteria comprises applying a first matching criterion to the plurality of data elements and subsequently applying a second matching criterion to the plurality of data elements, wherein all data elements that satisfy the first matching criteria also satisfy the second matching criteria.

15. The non-transitory computer readable medium of claim 14, wherein:

a) the first matching criterion is satisfied based on matching data and horizontal position;

b) the second matching criterion is satisfied based on matching data type, horizontal position and horizontal extent; and c) the set of matching criteria comprises:

i) a third matching criterion satisfied based on matching data type, horizontal position, and horizontal extent within an extent offset;

ii) a fourth matching criterion satisfied based on matching horizontal position; and iii) a fifth matching criterion satisfied based on matching horizontal position within a position offset;

wherein the first, second and third matching criteria are applied by matching existing groups against each other.

16. The non-transitory computer readable medium of claim 15, wherein generating the set of data element groups based on applying the set of matching criteria comprises applying the third matching criterion at least two times using different extent offsets.

17. The non-transitory computer readable medium of claim 13, wherein:

a) existing groups that would be tested for horizontal overlaps during performance of the set of acts would each be associated with:
  i) a preceding whitespace extent that includes only whitespace between data elements within that group and that group's data elements' left neighbors;
  ii) a data element extent that horizontally encompasses all data elements comprised within that group; and
  iii) a subsequent whitespace extent that includes only whitespace between data elements within that group and that group's data elements' right neighbors; and
b) testing for horizontal overlaps between data elements and neighbors of data elements in existing groups would be performed based on:
  i) comparing the data element extent of a first existing group with the preceding whitespace extent and subsequent whitespace extent of a second existing group; and
  ii) comparing the data element extent of the second existing group with the preceding whitespace and subsequent whitespace extent of the first existing group.

18. The non-transitory computer readable medium of claim 13, wherein assigning the data elements to columns based on the set of data element groups comprises applying the data element groups to columns of the output document by, for each group from the set of data element groups:

a) determining if any data element in that group shares a row with any data element in any other group that has already been applied to a column; and
b) in the event that any data element in that group shares a row with any data element in any other group that has already been applied to a column, apply that group to a first column to the right of a rightmost column assigned to a group comprising a data element in a shared row.

* * * * *

UNITED STATES PATENT AND TRADEMARK OFFICE
CERTIFICATE OF CORRECTION

PATENT NO. : 10,678,998 B1
APPLICATION NO. : 16/371626
DATED : June 9, 2020
INVENTOR(S) : Matt Maslin Page 1 of 1

It is certified that error appears in the above-identified patent and that said Letters Patent is hereby corrected as shown below:

In the Claims

Column 19, Claim 11 a) i), Line 57, reads "whitespace between data elements by within..."; which should be deleted and replaced with "whitespace between data elements within..."

Signed and Sealed this
Eleventh Day of August, 2020

Andrei Iancu
*Director of the United States Patent and Trademark Office*